INVENTOR
JOSEPH WILLARD HOFFMAN

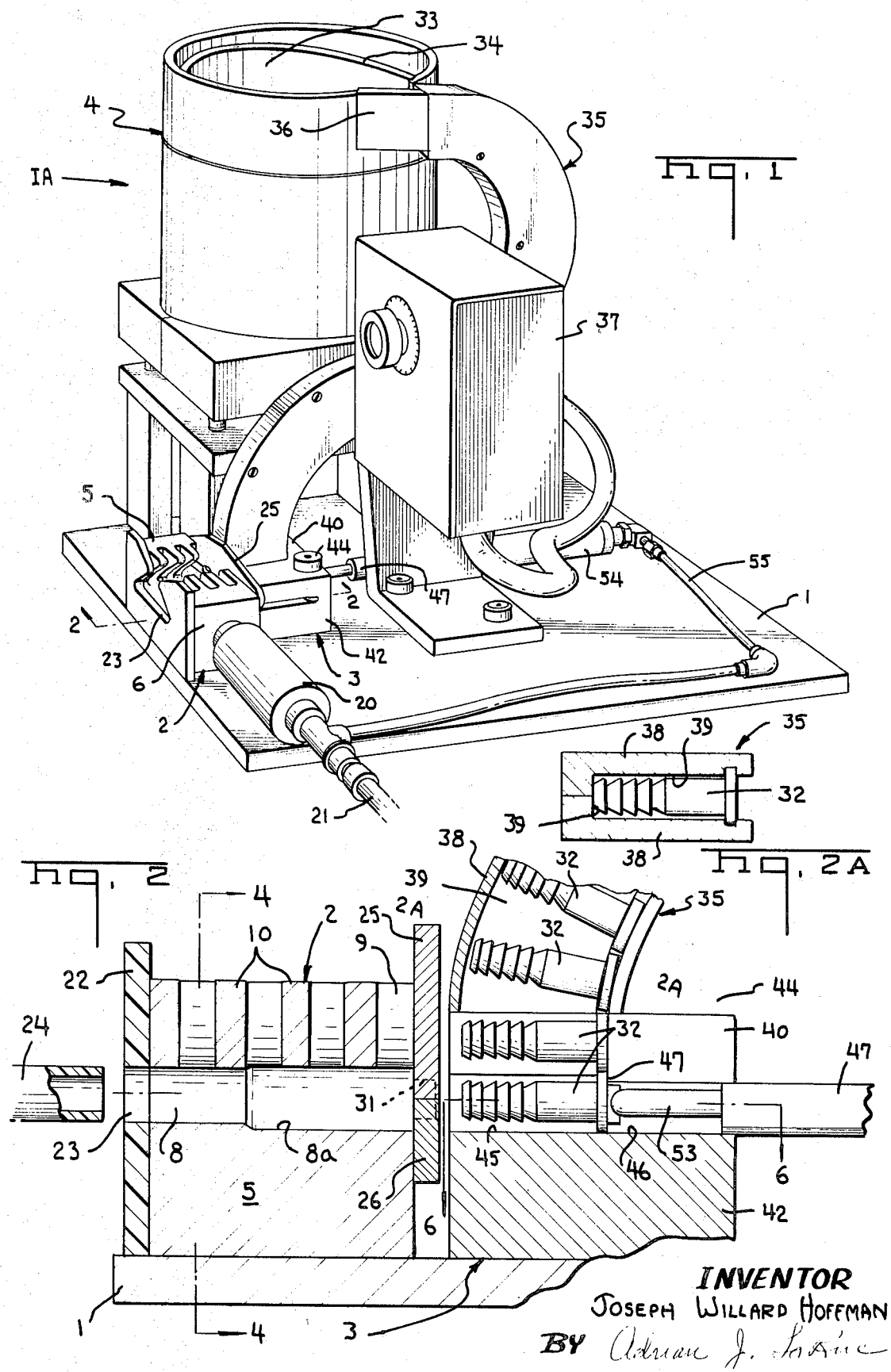

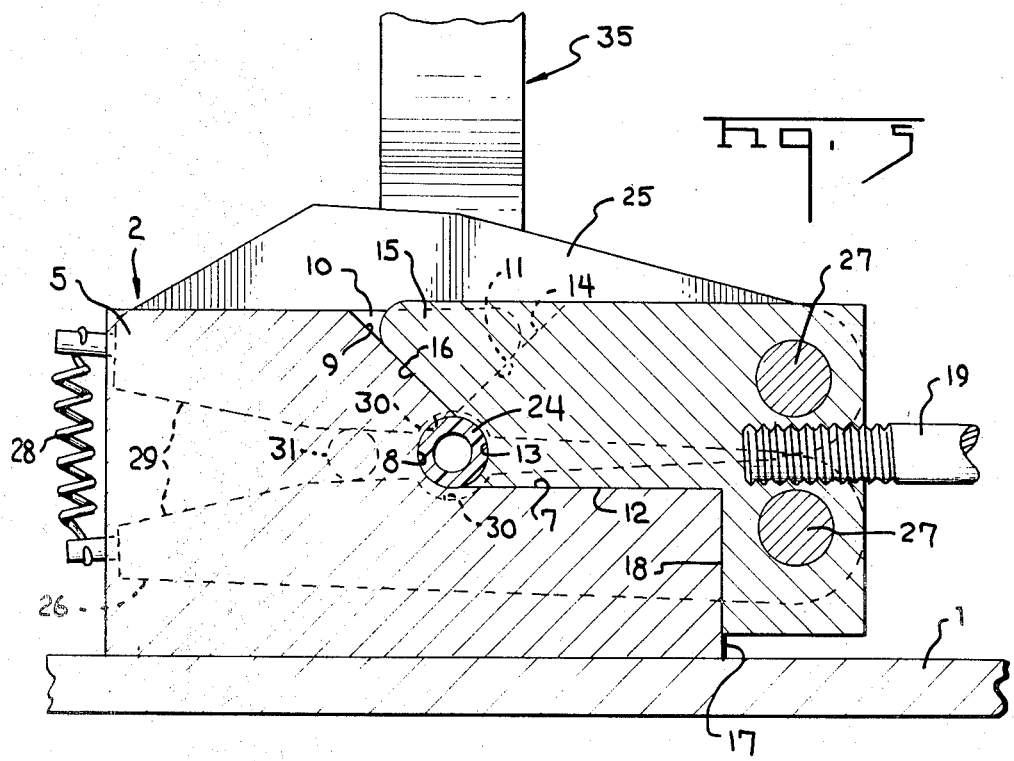
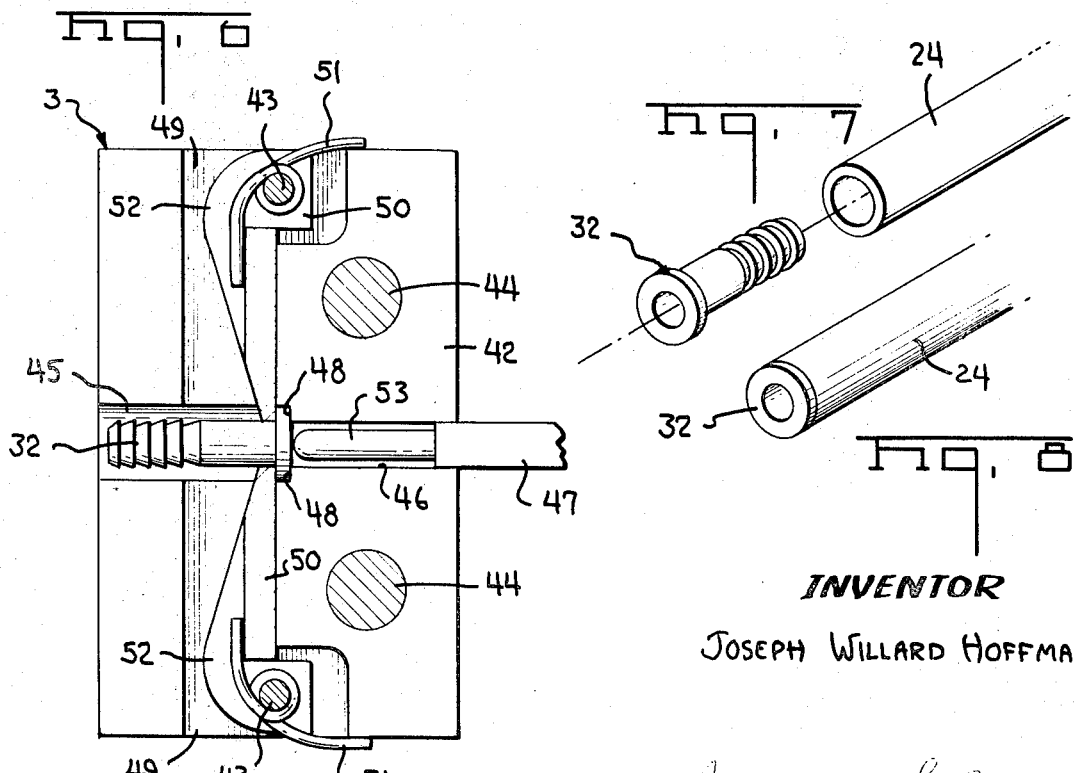

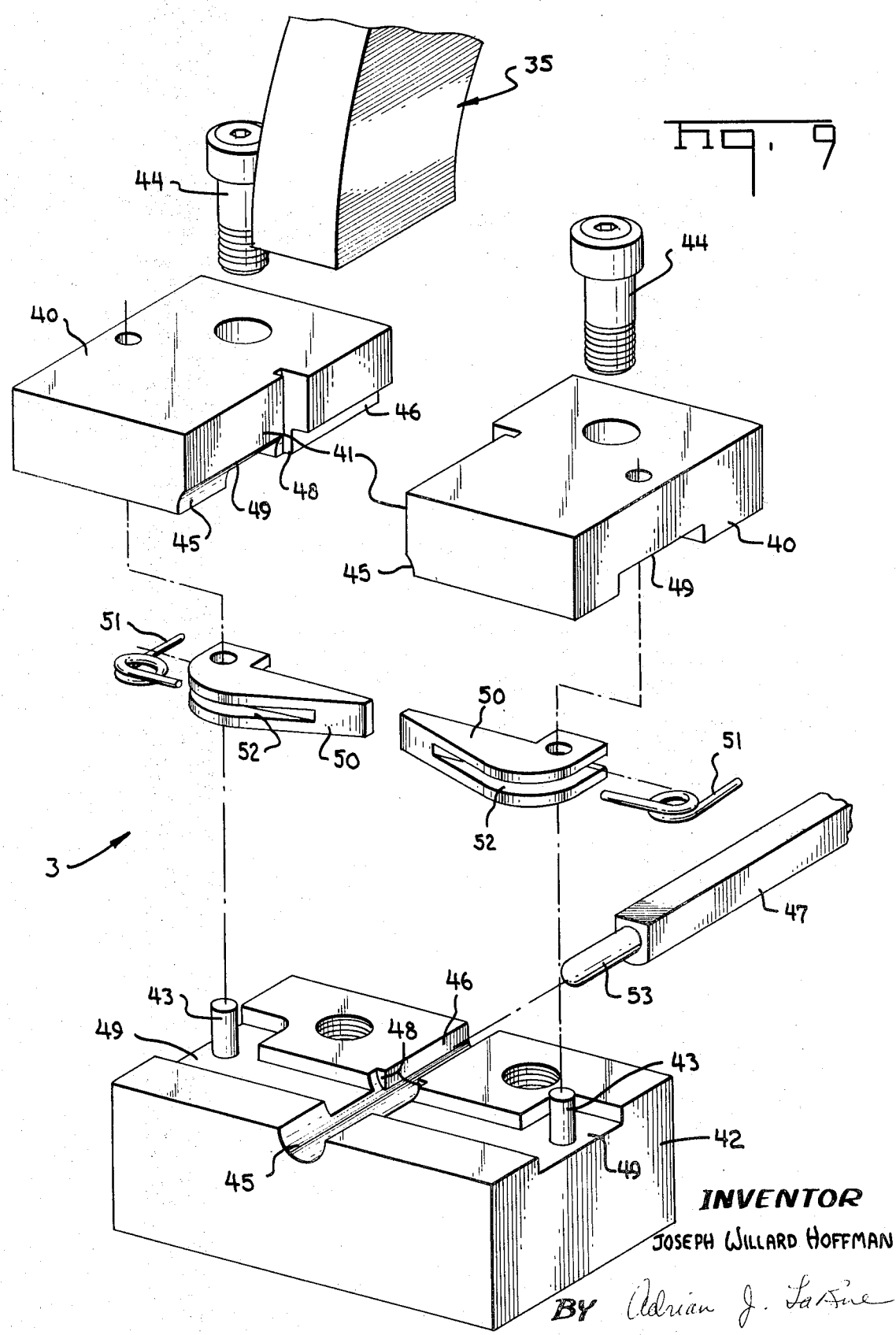

United States Patent Office 3,535,764
Patented Oct. 27, 1970

3,535,764
INSERTING APPARATUS
Joseph Willard Hoffman, Liverpool, Pa., assignor to AMP Incorporated, Harrisburg, Pa.
Filed Jan. 9, 1968, Ser. No. 696,554
Int. Cl. B23p 7/10, 19/04
U.S. Cl. 29—208                                7 Claims

ABSTRACT OF THE DISCLOSURE

An inserting apparatus for inserting members into the end of tubular members comprises jaw members for engaging and holding an end of a tubular member in position so that an insert member can be inserted into the end of the tubular member.

---

This invention relates to an inserting apparatus and more particularly to an apparatus for inserting insert members into ends of tubular members.

In some applications, the insertion of insert members into the ends of tubular members is necessary. One such application is the insertion of insert members into the ends of tubular members which are to be used in the coupling devices disclosed in U.S. patent application, Ser. No. 517,747, filed Dec. 30, 1965, now Pat. No. 3,378,282. It is essential that the insert members be automatically inserted into the ends of tubular members when a large number of tubular members are to be connected in the coupling devices.

An object of the invention is to provide an inserting apparatus for automatically inserting insert members into the ends of tubular members.

Another object of the invention is the provision of means for grasping an end of tubular member and holding the end in position for receiving an insert member therein without disfiguring the end of the tubular member.

A further object of the invention is to provide an inserting apparatus having means for positioning the end of a tubular member in alignment with an insert member to be inserted therein and for permitting the insert member to be inserted within the end of the tubular member.

An additional object of the invention is the provision of an inserting apparatus having means to maintain insert members to be inserted into the ends of tubular members in an operative position prior to being inserted into the ends of the tubular members.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

Figure 3:
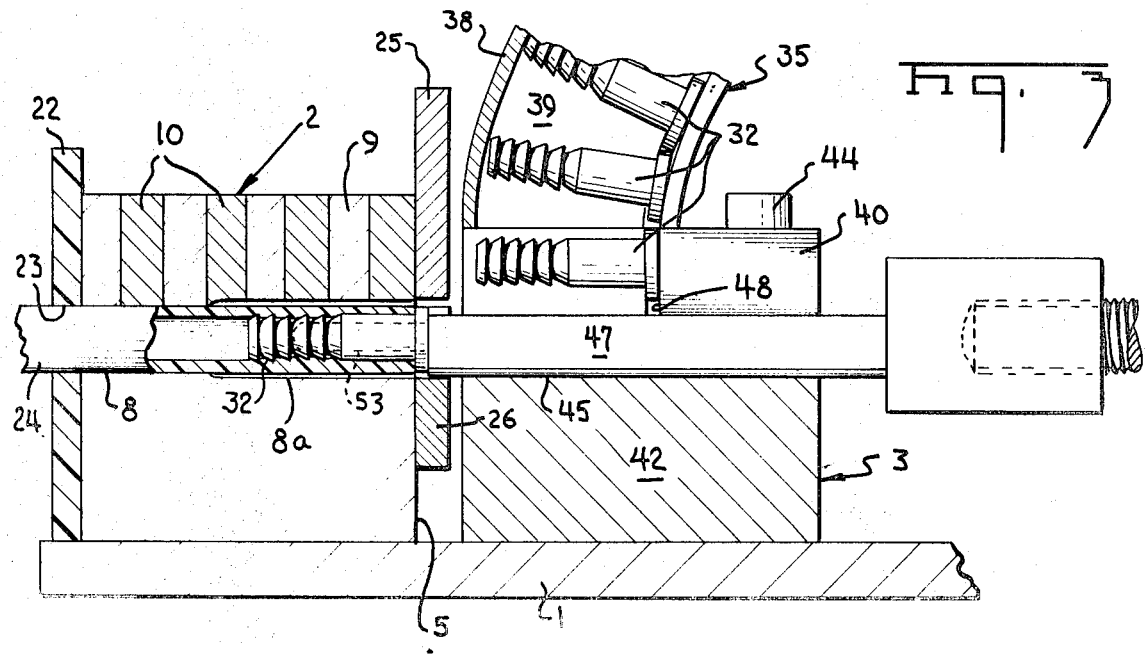
Figure 4:
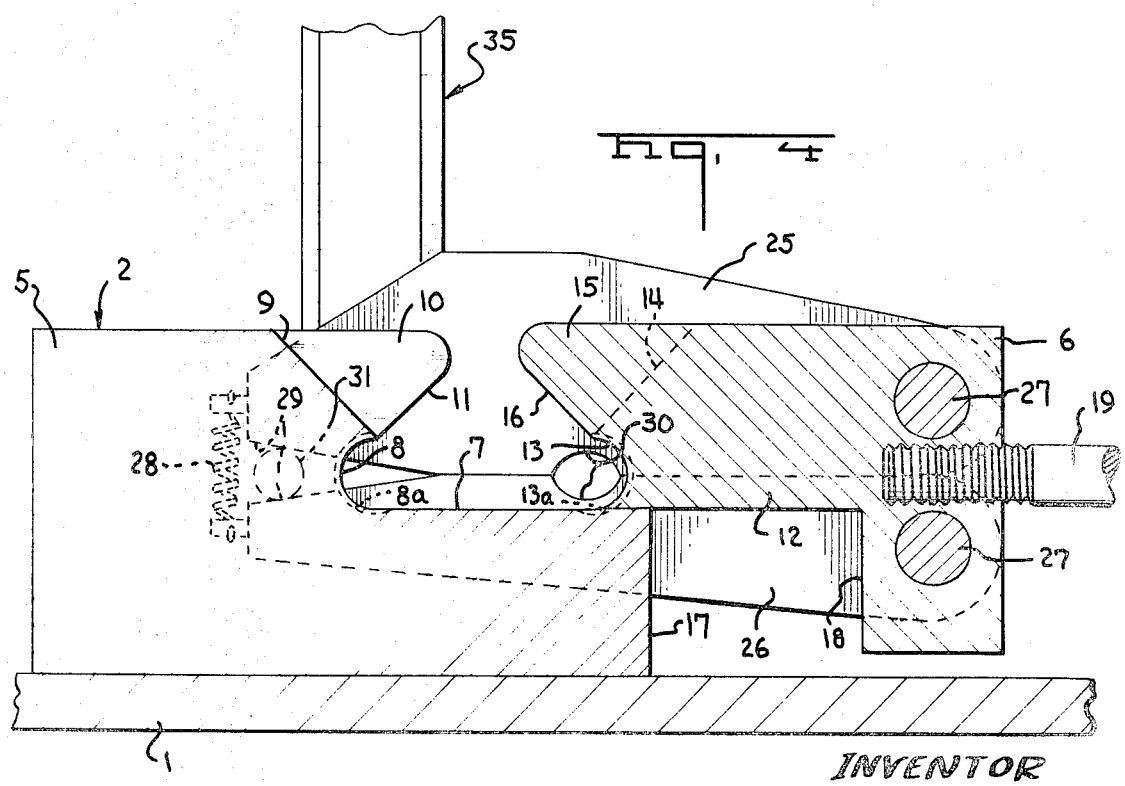

In the drawings:
FIG. 1 is a perspective view of the inserted apparatus;
FIG. 2 is a view taken along lines 2—2 of FIG. 1;
FIG. 2a is a view taken along lines 2a—2a of FIG. 2;
FIG. 3 is a view similar to FIG. 2 showing an insert member being inserted into the end of a tubular member;
FIG. 4 is a view taken along lines 4—4 of FIG. 2;
FIG. 5 is a view similar to FIG. 4 with the jaws in an operative position holding an end of a tubular member in alignment to receive an insert member therein;

FIG. 6 is a view taken along lines 6—6 of FIG. 2;
FIG. 7 is a perspective exploded view of an insert member in alignment with an end of a tubular member;
FIG. 8 is a view similar to FIG. 7 with the insert member in position at the end of the tubular member; and
FIG. 9 is an exploded perspective view of the elements of the means to maintain the insert members in an operative position prior to being inserted into the end of a tubular member.

Inserting apparatus IA includes a base 1 on which is mounted a jaw means 2, retaining means 3 and a feed means 4. Jaw means 2 comprises a stationary jaw member 5 and a moveable jaw member 6. Stationary jaw member 5 is secured on base 1 and it includes a bearing surface 7 which merges into a semi-circular surface 8. A tapered surface 9 merges with semi-circular surface 8 opposite bearing surface 7 and teeth 10 extend outwardly from tapered surface 9 at equally spaced intervals. Pick-up fingers 10 are provided with tapered surfaces 11 which are radiused at their outer ends.

Movable jaw member 6 has a surface 12 in engagement with bearing surface 7 so that surface 12 is movable along bearing surface 7 and is guided thereby. A semi-circular surface 13 is located at the outer end of surface 12 and tapered surface 14 merges with semi-circular surface 13 at the upper end thereof. Pick-up fingers 15 extend outwardly from tapered surface 14 at equal intervals therealong and they have tapered surfaces 16 which are radiused at the outer ends thereof. When movable jaw 6 is moved relative to stationary jaw 5, fingers 15 mesh with fingers 10 of stationary jaw member 5 with tapered surfaces 11 of fingers 10 engaging tapered surface 14 of movable jaw member 6 while tapered surfaces 16 of fingers 15 engage tapered surface 9 of stationary jaw member 5 and semi-circular surfaces 8 and 13 form a circle as illustrated in FIG. 5. Surfaces 17 and 18 of jaw members define stop surfaces to limit the movement of movable jaw member 6 relative to stationary jaw member 5.

Semi-circular surfaces 8 and 13 are provided with similarly constructed surfaces 8a and 13a but of a larger radius. Thus, surfaces 8a and 13a are enlarged sections of semi-circular surfaces 8 and 13, respectively. A shaft 19 is connected to movable jaw member 6 and shaft 19 is part fo a fluid operated piston disposed in a cylinder 20, the piston being spring biased so that movable jaw member 6 is disposed in a normally inoperative position as illustrated in FIGS. 1 and 4. Tubing 21 is connected to cylinder 20 to provide fluid thereto. A guide plate and guard 22 is secured onto stationary jaw member 5 and includes an opening 23 therein through which a tubular member 24 is guided to a position between jaw members 5 and 6.

Stop plates 25 and 26 are pivotally mounted on movable jaw member 6 via pivot pins 27 and they are held in engagement with each other by means of spring 28 when jaw member 6 is in its normally inoperative position as illustrated in FIG. 4. Stop plates 25 and 26 are provided with beveled surfaces 29 at the outer ends thereof and arcuate depressions 30 in the normally engaged surfaces. Beveled surfaces 29 are disposed adjacent a pin 31 located on the inner surface of stationary jaw member 5 and this pin serves to move stop plates 25 and 26 apart from one another as movable jaw member 6 moves relative to stationary jaw member 5 so that arcuate depressions 30 are spaced from each other a sufficient distance when they are positioned opposite a position in retaining means 3 at which an insert or eyelet 32 is to be inserted into tubular member 24 as illustrated in FIG. 5. Stop plates 25 and 26, as illustrated in FIG. 4, define stop means to limit and position tubular member 24 when inserted between jaw members 5 and 6. If desired, only stop plate 25 need be used and it can be provided with a camming slot engageable with pin 31 to effect its proper operation; such an arrangement would eliminate plate 26 and spring 28. Of course, single plate 25 can operate under the influence of gravity.

Feed means 4 is preferably a conventional feeding device made by the Syntron Company, Homer City, Pa. and it includes a receiving area 33 in which inserts 32 are placed, the inserts moving along a spiral path 34 which communicates with a track 35. An orientating means 36 connects track 35 with the upper end of spiral path 34 and it properly orients inserts 32 within track 35 as illustrated in FIGS. 2, 2a and 3. Feed means 4 includes control means 37 to control the speed at which the feed means operates.

Track 35 comprises double-curved members 38 which are provided with recesses 39 which define when the members 38 are secured together a path of T-shaped configuration along which inserts 32 move as illustrated in FIG. 2a. The path is open at the rear so as to enable an operator to unjam the track if such is necessary.

The bottom of track 35 is disposed on top of plates 40 of retaining means 3. Plates 40 are provided with recesses 41 corresponding to recesses 39 in track 35 so as to provide an opening of T-shaped configuration to receive inserts 32 therein when plates 40 are secured in position on plate 42 via pins 43 and bolts 44. Plates 40 and 42 are provided with recesses 45 and 46 with recesses 45 defining an opening in which an insert 32 rests prior to being inserted within a tubular member 24 and recesses 46 defining an opening in which a plunger 47 moves to drive the insert resting in recesses 45 into the tubular member 24. Surfaces 48 are disposed in plates 40 and 42 between recesses 45 and 46 and these surfaces serve as stop surfaces against which the head of an insert 32 is retained prior to the insert being inserted into the end of a tubular member 24 via plunger 47 as illustrated in FIG. 6.

L-shaped recesses 49 are located in plates 40 and 42 and when plates 40 are secured in position on plate 42 these L-shaped recesses provide L-shaped openings on each side of recesses 45 and in communication therewith. Retaining members 50 are disposed in the L-shaped openings and they are pivotally mounted on pins 43 therein. Coil springs 51 are disposed in channels 52 of retaining members 50 and they are also mounted on pins 43 with one of the legs thereof being in engagement with plate 42 while the other legs are in engagement with retaining members 50 so as to maintain them in normal engagement with the sides of the L-shaped openings adjacent surfaces 48 so that the ends of the retaining members can engage a head of an insert disposed in recesses 45 to retain the head against surfaces 48 as illustrated in FIG. 6.

Plunger 47 is provided with a smaller section 53 which is movable into the insert positioned in recesses 45. Plunger 47 is part of a piston which is movably mounted in cylinder 54 and it is maintained in a normally inoperative position via a spring means, cylinder 54 being connected to tubing 21 via tubing 55 as a branch thereof. Tubing 21 is connected through a source of fluid supply via a conventional foot operated switch, (not shown) to actuate inserting apparatus IA.

The operation of inserting apparatus IA is according to the following:

Tubular member 24 is inserted through opening 23 between jaw members 5 and 6 until the end thereof is brought into engagement with stop plates 25 and 26 whereupon the foot operated switch is pressed by the operator causing fluid under pressure to flow via tubing 21 into cylinder 20 and via tubing 55 into cylinder 54. Such action causes movable jaw member 6 to move relative to stationary jaw member 5 until surfaces 17 and 18 are in engagement, stop plates 25 and 26 have been moved away from each other so that arcuate depressions 30 are spaced apart and are in alignment with the opening presented by recesses 45 in retaining means 3 and semi-circular surfaces 8 and 13 of the jaw members tightly engage tubular member 24 and hold it in position without deforming the tubular member. The action of the fingers 10 and 15 is such that the tubular member 24 can be inserted between jaw members 5 and 6 in any angular disposition and these fingers will move the tubular member into proper position for receiving the insert therein. Tubing 55, as a result of its configuration and a constricted area therein, causes a slight delay in the movement of the fluid along tubing 55 to cylinder 54 and the piston in cylinder 54 is now operated to move plunger 47 along the opening in retaining means 3 whereupon section 53 moves inside of insert 32 and plunger 47 engages the head of insert 32 thereby forcing this insert into the end of tubular member 24. Sections 8a and 13a of the jaw members provide room for expansion of the tubular member upon insertion of the insert therein. The operation is a one-shot operation whereupon the fluid pressure is released through a conventional valving system and the pistons in cylinders 20 and 54 return under the action of spring means to their normally inoperative positions so that tubular member 24 with insert 32 in place therein as illustrated in FIG. 8 can now be removed from between jaw members 5 and 6 and another insert 32 moves into the opening provided by recesses 45 as soon as plunger 47 moves free of these recesses and retaining members 50 under the influence of springs 51 engage the head of the insert to thereby retain the same against surfaces 48. Inserting apparatus is now ready to insert another insert into the end of another tubular member in accordance with the operation as heretofore described. The tubular members can be plastic or metal but they are of a nature requiring an insert when they are to be used in the coupling devices of the heretofore-mentioned patent application.

It will, therefore, be appreciated that the aforementioned and other desirable objects have been achieved; however, it should be emphasized that the particular embodiment of the invention, which is shown and described herein, is intended as merely illustrative and not as restrictive of the invention.

The invention is claimed in accordance with the following:

1. An apparatus for inserting an insert member into an end of a tubular member comprising means for engaging and holding said tubular member in a position to receive said insert member, stop means adjacent said engaging and holding means to limit the movement of said tubular member within said engaging and holding means, retaining means adjacent said stop means for retaining said insert member in position for insertion into the end of said tubular member, and means for driving said insert member into the end of said tubular member while said tubular member is being held by said engaging and holding means.

2. An apparatus for inserting an insert member into an end of a tubular member comprising feed means for feeding insert members, retaining means in alignment with said feed means for receiving said insert members and for retaining said insert members in position at least one at a time for insertion into the ends of tubular members, holding means adjacent said retaining means for holding said end of said tubular member in alignment with the insert member in said retaining member that is in position for insertion in the end of the tubular member, and driving means for movement along said retaining means and for driving the insert member from said retaining means into the end of the tubular member.

3. An apparatus according to claim 2 wherein means is provided in said retaining means for engaging each insert member and holding same in position in said retaining means.

4. An apparatus according to claim 2 wherein said holding means includes a movable and a stationary jaw means each having pick-up teeth means for engaging and holding said tubular member without deformation thereto.

5. An apparatus according to claim 2 wherein stop means is provided between said retaining means and said holding means for stopping the end of the tubular member in position adjacent said retaining means.

6. An apparatus according to claim 2 wherein spring-biased retaining members are provided in said retaining means for engagement with a head of the insert member to retain said insert member in position prior to being driven into the end of the tubular member by said driving means.

7. An apparatus for inserting an insert member into an end of a tubular member comprising feed means for feeding insert members, retaining means adjacent one end of said feed means for retaining one of said insert members in an inserting position, holding means positioned adjacent said retaining means for engaging said tubular member and holding same in alignment with said one insert member, means for driving said one insert member from said retaining means into an end of said tubular member, and stop means provided between said retaining means and said holding means for stopping the end of the tubular member in position adjacent said retaining means.

References Cited
UNITED STATES PATENTS

| | | | |
|---|---|---|---|
| 2,604,692 | 7/1952 | Broden | 29—208 X |
| 2,699,600 | 1/1955 | Korecky | 29—211 X |
| 3,073,016 | 1/1963 | Drake | 29—235 |
| 3,393,439 | 7/1968 | Shriver | 29—208 |

THOMAS H. EAGER, Primary Examiner

U.S. Cl. X.R.

29—211